US012636911B1

(12) United States Patent
Robinson

(10) Patent No.: US 12,636,911 B1
(45) Date of Patent: May 26, 2026

(54) TIRE ROTATING ACCESSORY

(71) Applicant: Kevin A. Robinson, Brighton, CO (US)

(72) Inventor: Kevin A. Robinson, Brighton, CO (US)

( * ) Notice: Subject to any disclaimer, the term of this patent is extended or adjusted under 35 U.S.C. 154(b) by 377 days.

(21) Appl. No.: 18/494,549

(22) Filed: Oct. 25, 2023

Related U.S. Application Data

(63) Continuation-in-part of application No. 18/130,869, filed on Apr. 4, 2023, now Pat. No. 12,344,035, which is a continuation-in-part of application No. 17/124,364, filed on Dec. 16, 2020, now Pat. No. 11,745,540.

(60) Provisional application No. 62/958,238, filed on Jan. 7, 2020.

(51) Int. Cl.
| | |
|---|---|
| *B66F 15/00* | (2006.01) |
| *B60B 29/00* | (2006.01) |
| *B60B 30/02* | (2006.01) |
| *B60B 30/10* | (2006.01) |
| *B66F 5/02* | (2006.01) |

(52) U.S. Cl.
CPC ............ *B60B 29/001* (2013.01); *B60B 30/02* (2013.01); *B60B 30/10* (2013.01); *B66F 5/02* (2013.01)

(58) Field of Classification Search
CPC . B66F 15/00; B66F 5/02; B60B 30/02; B60B 30/10; B60B 29/001
See application file for complete search history.

(56) References Cited

U.S. PATENT DOCUMENTS

| | | | | |
|---|---|---|---|---|
| 7,699,274 | B2 * | 4/2010 | Riibe | F16L 3/16 248/55 |
| 7,984,691 | B2 * | 7/2011 | Swartz | G03G 21/0094 134/116 |
| 8,262,071 | B2 * | 9/2012 | Huang | B26D 7/2628 104/53 |
| 8,342,483 | B1 * | 1/2013 | Manning | B65H 57/14 254/134.3 R |
| 11,745,540 | B1 * | 9/2023 | Robinson | B66F 15/00 254/131 |
| 12,344,035 | B1 * | 7/2025 | Robinson | B60B 30/02 |
| 2014/0084530 | A1 * | 3/2014 | Hodges | B60B 30/00 269/296 |
| 2014/0224429 | A1 * | 8/2014 | Kliskey | B60C 25/147 157/1 |

* cited by examiner

*Primary Examiner* — Lee D Wilson
(74) *Attorney, Agent, or Firm* — QuickPatents; Kevin Prince

(57) ABSTRACT

A device for lifting a wheel and rolling the wheel on a surface includes an elongated rigid plate having a top side, a bottom side, a peripheral edge, a pedal portion at a rear end of the rigid plate, and a wheel portion at a forward end of the rigid plate. A ground roller is fixed with the bottom side of the rigid plate and at least two wheel rollers are fixed with a top side of the wheel portion. In use, with the wheel resting on the wheel rollers, the pedal portion may be pressed downwardly to pivot the rigid plate about the roller to lift the wheel. The lifting device is then rolled on the surface to place the wheel at a desired position, and rotated until obtaining a desired rotational orientation.

3 Claims, 6 Drawing Sheets

TIRE ROTATING ACCESSORY

CROSS-REFERENCE TO RELATED APPLICATIONS

This application is a Continuation-in-Part of U.S. patent application Ser. No. 18/130,869, filed on Apr. 4, 2023, which itself is a Continuation-in-Part of U.S. patent application Ser. No. 17/124,364, filed on Dec. 16, 2020, which itself claimed the benefit of U.S. Provisional Patent Application 62/958,238, filed on Jan. 7, 2020, all applications being incorporated herein by reference.

STATEMENT REGARDING FEDERALLY SPONSORED RESEARCH AND DEVELOPMENT

Not Applicable.

FIELD OF THE INVENTION

This invention relates to automotive repair, and more particularly to a device for facilitating the rotation of tires and wheel assemblies.

BACKGROUND

When changing or rotating tires on a vehicle, it is cumbersome to lift and simultaneously rotate and position the wheels for mounting on the vehicle. Such wheels, which typically include a tire mounted to a wheel rim, can be heavy and difficult to align with the vehicle. Prior art wheel management tools, such as the TRACJACK brand of wheel dolly produced by TRAC LLC of Brighton, Colorado, are excellent at lifting tires to a proper height. But certain models do not include any provision for rotating the tire to align the lug bolts with tire.

Therefore, there is a need for a device that allows a person to easily lift and rotate the wheel for mounting (or dismounting) from a vehicle, or the like. The needed device would be relatively simple to manufacture and intuitive to use, and would engage the wheel at a tire tread for stability. The present invention accomplishes these objectives.

SUMMARY OF THE INVENTION

The present device is used in conjunction with a lifting device for lifting a wheel, such as when installing the wheel onto a vehicle, for example. Typically it is cumbersome to simultaneously lift the wheel while aligning the wheel with the vehicle, and the present invention facilitates the rotating of the wheel to the vehicle when used with the lifting device or equivalent.

Such a lifting device typically includes an elongated rigid plate having a top side, a bottom side, at least one peripheral edge, a pedal portion at a rear end of the elongated rigid plate, and a wheel portion at a forward end of the elongated rigid plate. A ground roller is typically fixed with the bottom side of the elongated rigid plate proximate the wheel portion.

The present invention includes a wheel roller bracket having at least two wheel rollers. The wheel roller bracket is fixed with the wheel portion of the elongated rigid plate. Each wheel roller has two opposing ends and a rotational axis that is mutually parallel with that of each other wheel roller, and typically orthogonal to a ground roller rotational axis. Each wheel roller is fixed with a top side of the wheel roller bracket, preferably with a pair of the roller tabs formed from the wheel roller bracket and bent upwardly from two opposing sides thereof to rotationally capture the ends of the wheel roller.

As such, in use, with the wheel resting on the wheel portion of the elongated rigid plate, the pedal portion may be pressed downwardly such as with a person's foot to pivot the elongated rigid plate about the ground roller to lift the wheel. The lifting device is then rolled on the surface to place the wheel at a desired position for mounting on the vehicle. A gap is defined between the surface and the wheel portion of the elongated rigid plate, the wheel portion being substantially parallel with the surface. The wheel is then rotated on the at least one wheel roller to a desired rotational position for facilitating mounting of the wheel onto the vehicle.

The present invention is a device for use with a lifting device that allows a person to easily lift, position, and then rotate a wheel for mounting (or dismounting) from a vehicle, or the like. The present invention is relatively simple to manufacture and intuitive to use, and engages the wheel at a tire tread for stability. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
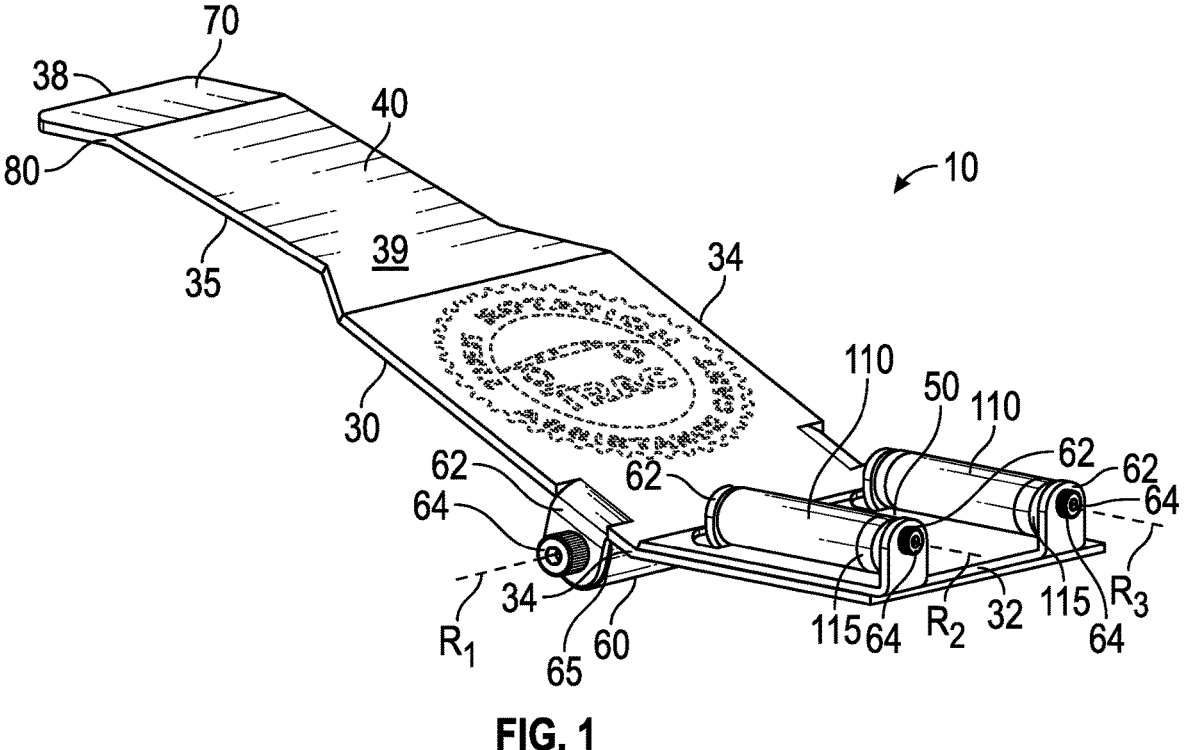
FIG. 1 is a front perspective view of the invention.
Figures 2, 3:
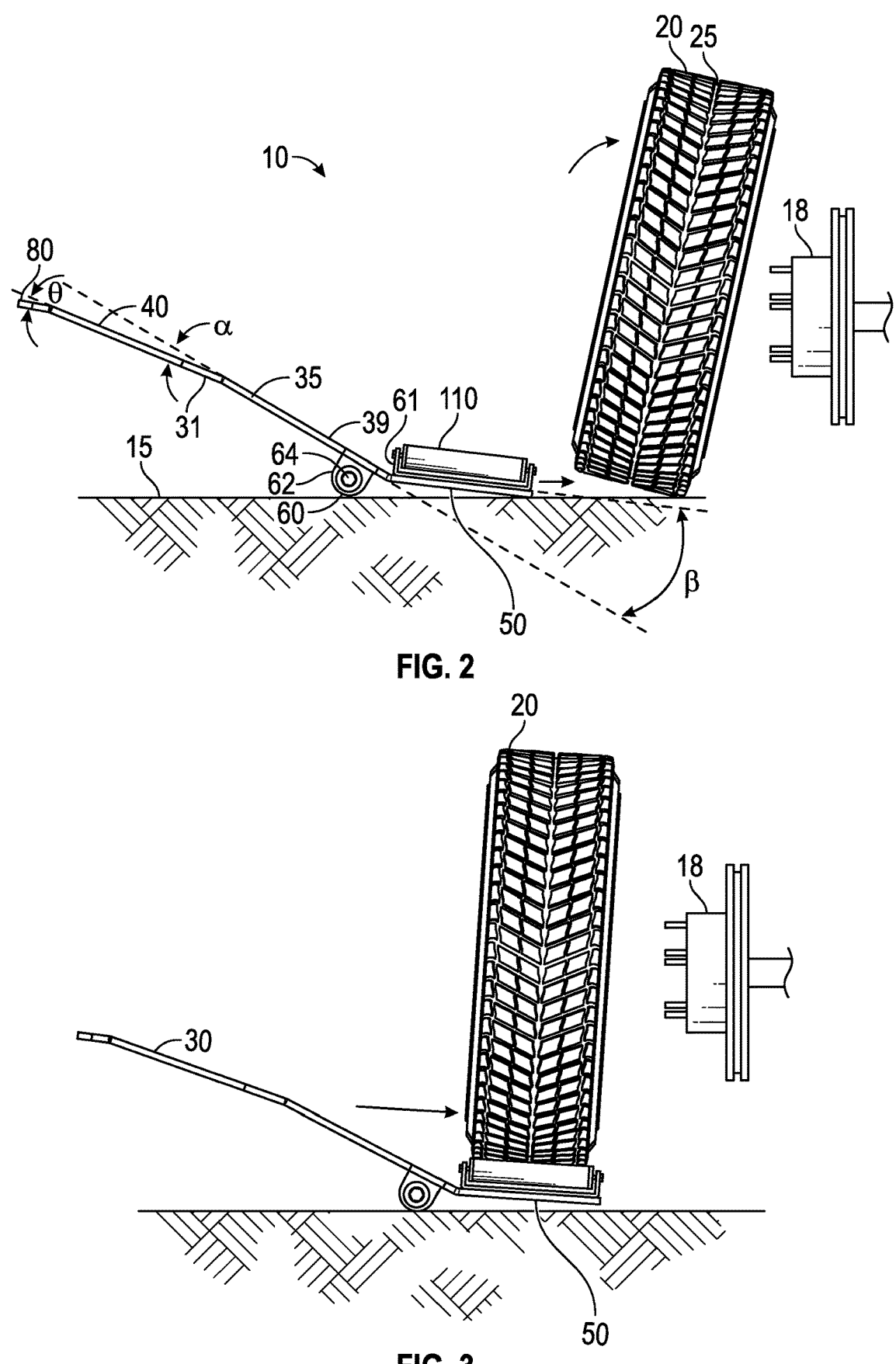
FIG. 2 is a side elevational view of the invention as approaching a wheel to lift.
FIG. 3 is a side elevational view of the invention as positioned under the wheel.

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, pod the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

FIGS. 1-5 illustrate a lifting device 10 for lifting a wheel 20 and rolling the wheel 20 on a surface 15, such as when installing the wheel 20 onto a vehicle 18, for example.

Typically it is cumbersome to simultaneously lift the wheel 20 while aligning the wheel 20 with the vehicle 18, and the present invention facilitates the rotating of the wheel 20 to the vehicle 18 when used with the lifting device 10 or equivalent.

Such a lifting device 10 typically includes an elongated rigid plate 30 having a top side 39, a bottom side 31, at least one peripheral edge 35, a pedal portion 40 at a rear end 38 of the elongated rigid plate 30, and a wheel portion 50 at a forward end 32 of the elongated rigid plate 30. The elongated rigid plate 30 is typically made from a rigid sheet metal material, which is formed by stamping, water-jet, laser, or the like from a metal sheet material.

A ground roller 60 is typically fixed with the bottom side 31 of the elongated rigid plate proximate the wheel portion 50. The ground roller 60 has two opposing ends 65 and a ground roller rotational axis $R_1$.

The present invention includes a wheel roller bracket 130, or wheel roller accessory, having at least two wheel rollers 110. The wheel roller bracket 130 is substantially flat and fixed with the wheel portion 50 of the elongated rigid plate 30. Each wheel roller 110 has two opposing ends 115 and a rotational axis $R_2$ that is mutually parallel with that of each other wheel roller 110, and typically orthogonal to the ground roller rotational axis $R_1$.

Figure 6:
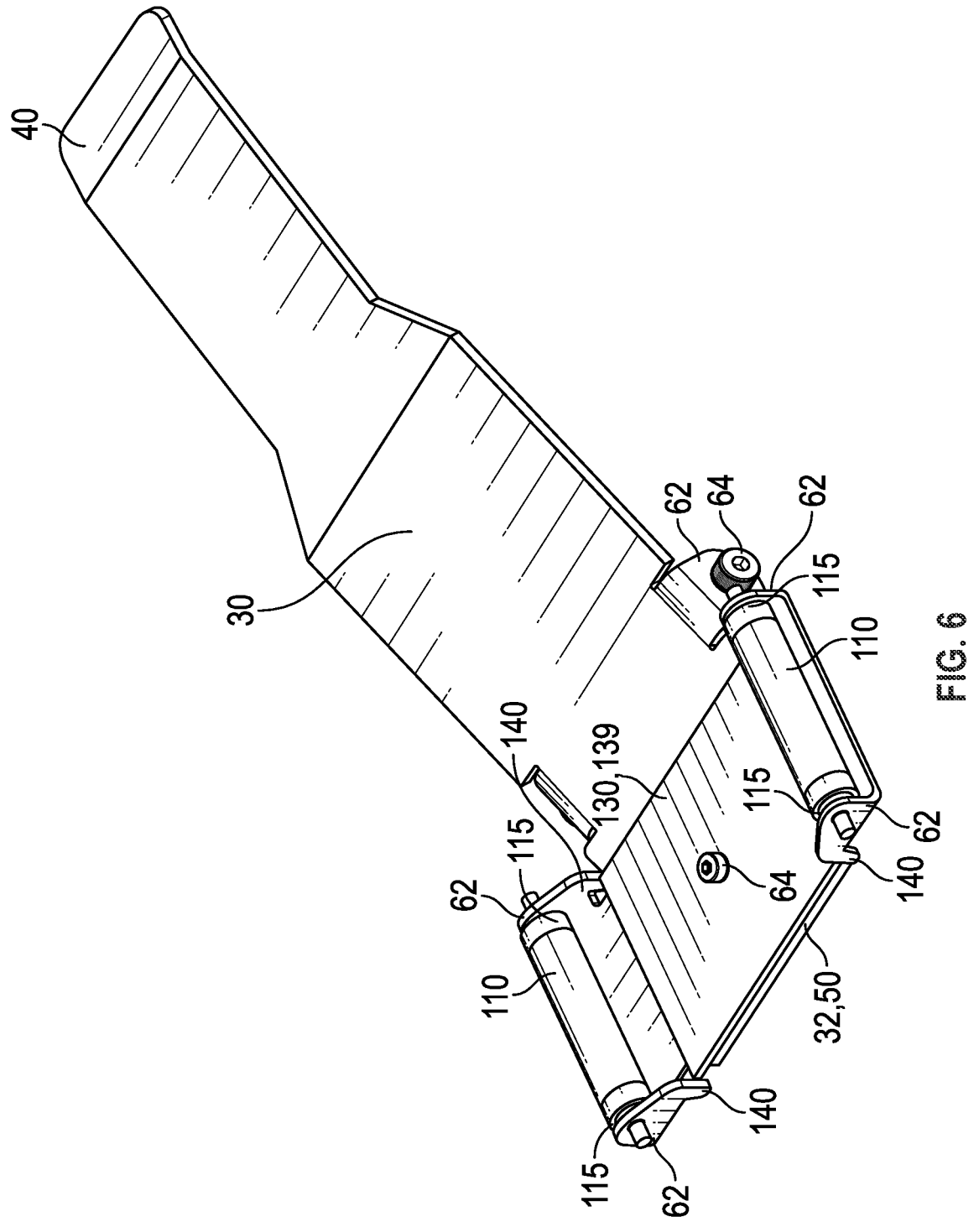
FIG. 6 is a top perspective view of the invention.

The wheel roller bracket 130 is formed from a strong metal sheet material and fixed with the wheel portion 50 with a mechanical fastener 64 such as a bolt and nut, or the like. Each wheel roller 110 is fixed with a top side 139 of the wheel roller bracket 130, preferably with a pair of the roller tabs 62 (FIG. 6) formed from the wheel roller bracket 130 and bent upwardly from two opposing sides 135 thereof to rotationally capture the ends 115 of the wheel roller 110.

Figure 4:
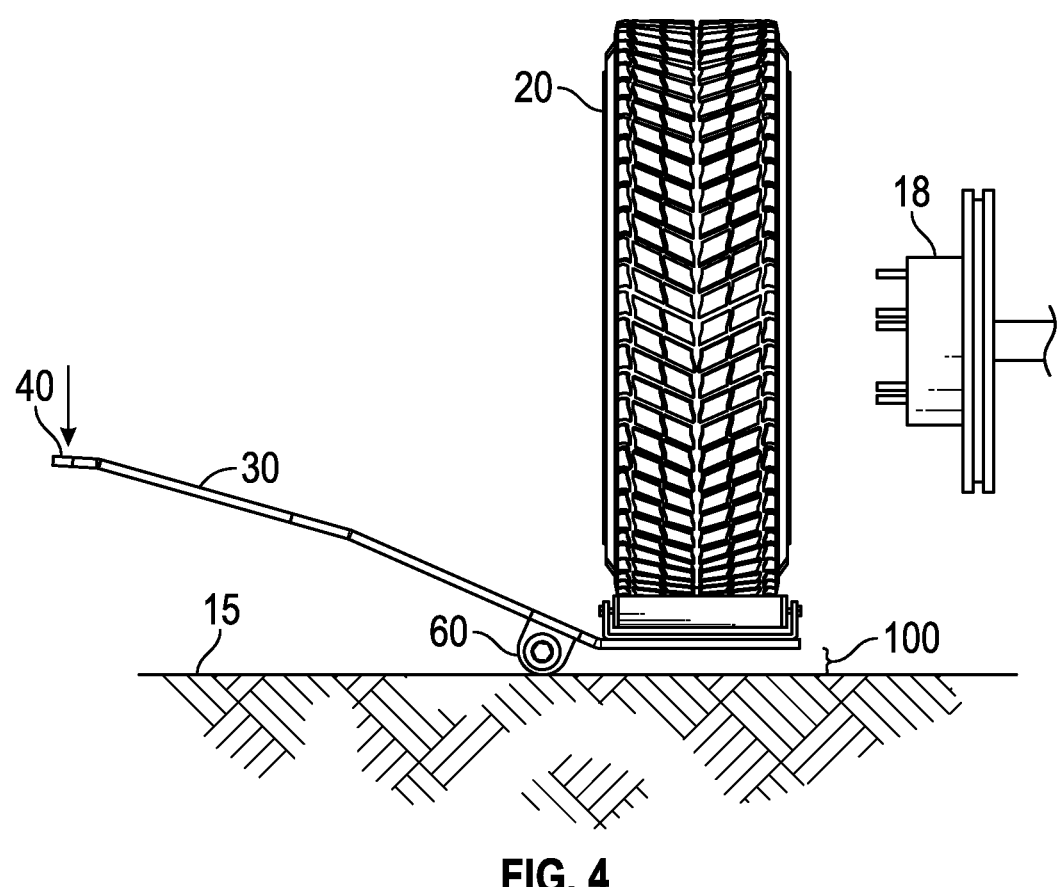
FIG. 4 is a side elevational view of the invention as lifted for mounting onto a vehicle.
Figure 5:
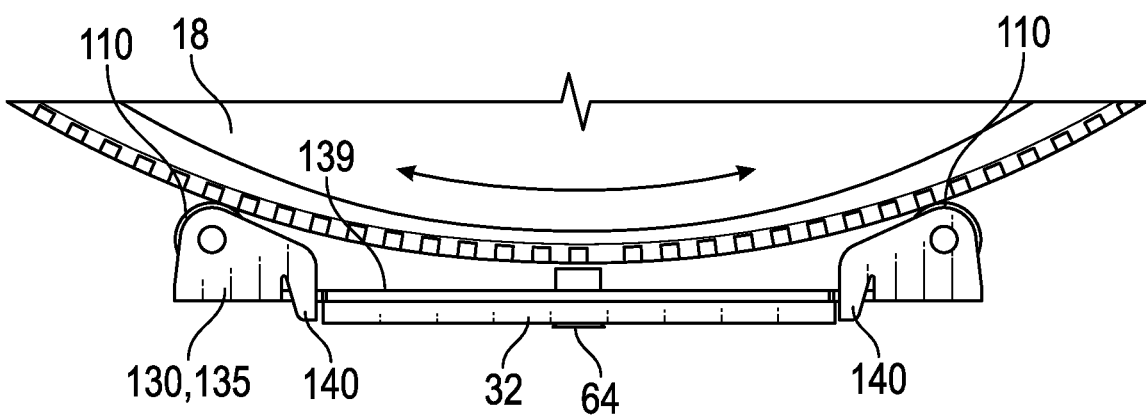
FIG. 5 is a front elevational view of the invention, the wheel rotatable before being mounted to the vehicle.
Figure 7:
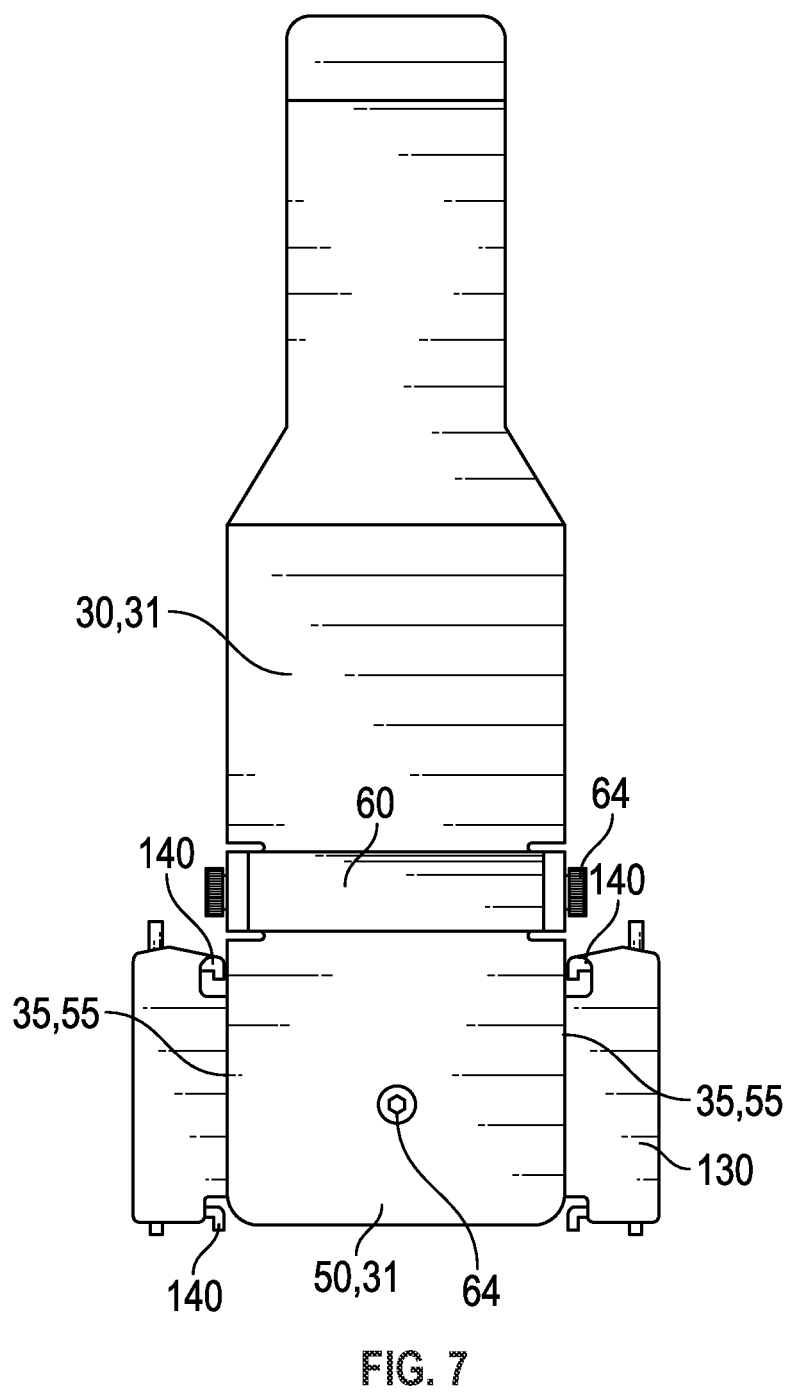
FIG. 7 is a bottom plan view of the embodiment of FIG. 7.
Figure 8:
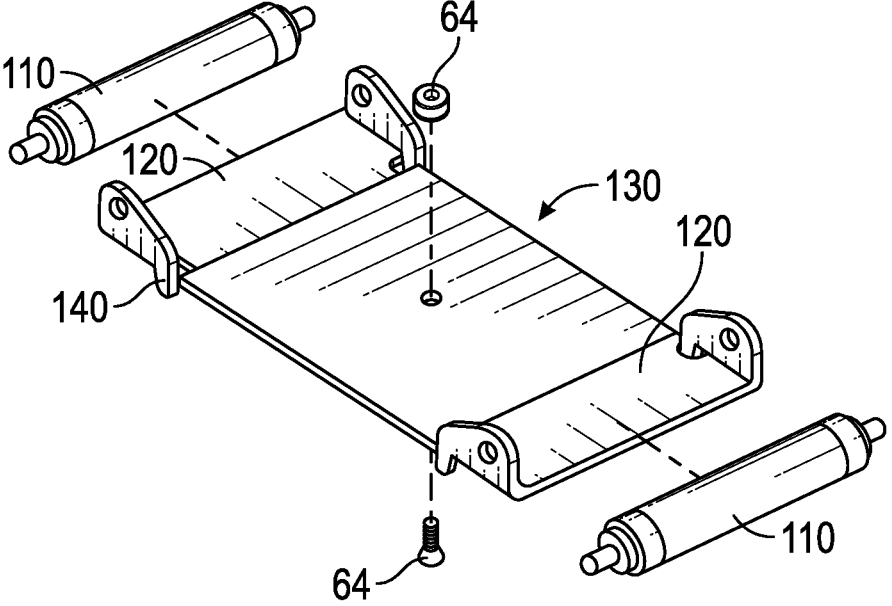
FIG. 8 is an exploded view of the invention.

As such, in use, with the wheel 20 resting on the wheel portion 50 of the elongated rigid plate 30, the pedal portion 40 may be pressed downwardly such as with a person's foot to pivot the elongated rigid plate 30 about the ground roller 60 to lift the wheel 20. The lifting device 10 is then rolled on the surface 15 to place the wheel 20 at a desired position for mounting on the vehicle 18. A gap 100 is defined between the surface 15 and the wheel portion 50 of the elongated rigid plate 30, the wheel portion 50 being substantially parallel with the surface 15 (FIG. 4). The wheel 20 is then rotated on the at least one wheel roller 110 (FIG. 5) to a desired rotational position or orientation for facilitating mounting of the wheel 20 onto the vehicle 18. In some embodiments, the wheel roller bracket 130 includes at least two downwardly projecting prongs 140 (FIGS. 7 and 8) that each engage one side 55 of the wheel portion 50 of the elongated rigid plate 30 to inhibit rotation of the wheel roller bracket 130 with respect to the elongated rigid plate 30.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A wheel roller accessory for a wheel lifting device of the type having a wheel portion that lifts a wheel off of a ground surface, the wheel roller accessory comprising:
   a substantially flat and elongated wheel roller bracket having a top side, a bottom side, and two opposing side edges, at least two wheel rollers fixed at the top side of the wheel roller bracket proximate the two opposing side edges, the wheel rollers having a mutually parallel rotational axis, the wheel roller bracket fixed with the wheel portion of the wheel lifting device;
   whereby with the wheel resting on the at least two wheel rollers of the wheel roller bracket, the lifting device may be used to lift the wheel off of the ground surface and place the wheel at a desired position, the wheel rotatable on the at least two wheel rollers to place the wheel at a desired rotational orientation;
   wherein each of the at least one wheel roller is fixed with the top side of the wheel roller bracket with a pair of roller tabs formed from the wheel roller bracket and bent upwardly from the two opposing side edges thereof to rotationally capture two opposing ends of the wheel roller.

2. The lifting device of claim 1 wherein the wheel roller bracket is fixed with the wheel portion of the lifting device with at least one mechanical fastener.

3. The lifting device of claim 2 wherein the wheel roller bracket includes at least two downwardly projecting prongs that each engage one side of the wheel portion of the lifting device to inhibit rotation of the wheel roller bracket on the wheel portion of the lifting device.

\* \* \* \* \*